Jan. 19, 1960     R. L. HUFFMAN     2,922,013
SWITCH WIPER ASSEMBLY
Filed June 25, 1958
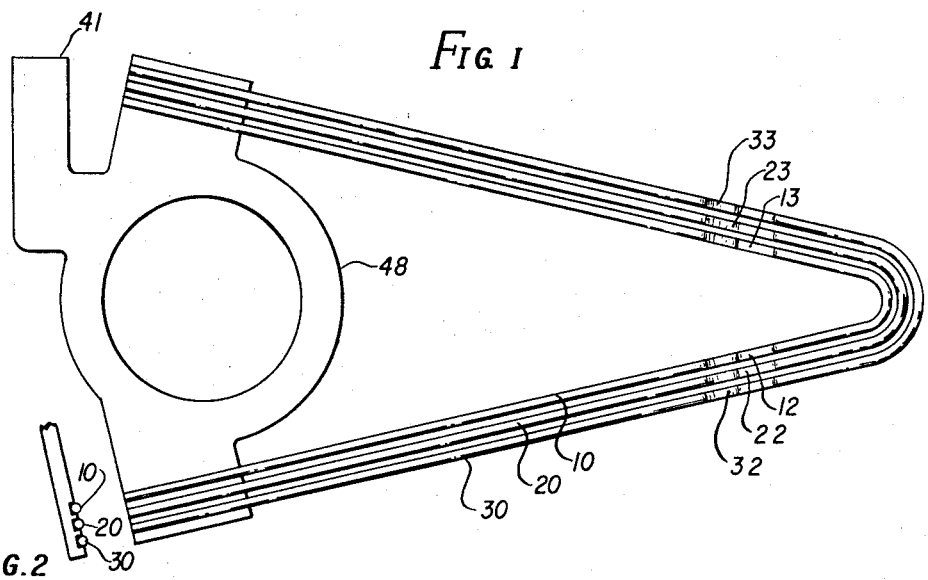
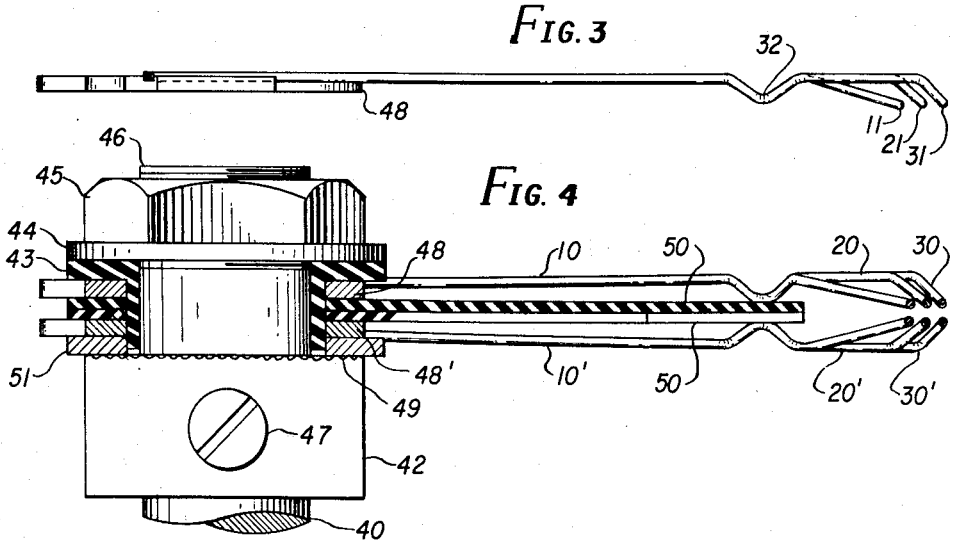
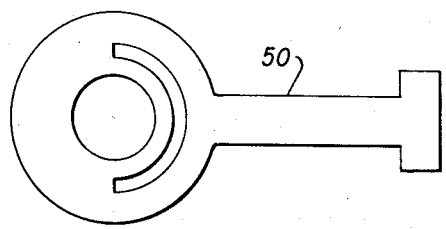
INVENTOR.
ROBERT L. HUFFMAN
BY
ATTY.

United States Patent Office 2,922,013
Patented Jan. 19, 1960

2,922,013

SWITCH WIPER ASSEMBLY

Robert L. Huffman, Palatine, Ill., assignor to General Telephone Laboratories, Incorporated, Northlake, Ill., a corporation of Delaware Application June 25, 1958, Serial No. 744,519

5 Claims. (Cl. 200—166)

This invention relates to wipers for use on stepping switches.

The major object of the invention is to provide a simply constructed stepping switch wiper which reduces microphonic noises in conversations transmitted through the switch wipers.

The invention is primarily designed for use on two-motion switches of the well-known Strowger type although it could readily be adapted for use on rotary switches. In switches of either of these types, a shaft having a number of wipers mounted to it is rotated driving these wipers across stationary levels of contacts until a selected contact position is reached. One or more circuits are then completed through the wipers to the contacts of the various levels at the selected position.

It has been found that when a number of switches are mounted on the same frame, operation or release of one switch sets up vibratory motion in adjacent switches. When audio frequency signals are being passed over a switch, the vibratory motion due to adjacent switches causes microphonic noises to be added to the audio signal thus distorting it. To combat this problem, many alternatives have been proposed and tried. Among these have been many forms of anti-bounce wipers such as using a rigid support extension having short length spring members.

The present invention consists of a set of coplanar hairpin shaped wipers of successively smaller curvature fitted within one another. The curved ends of the wires form the wiping surfaces. Due, therefore, to the multiplicity of contacting surfaces on the wiper and their individual contact pressure, a solid contact is virtually assured regardless of vibrations.

The wires as used may be stainless steel or other metals having superior abrasion characteristics. Further, the contacting curve of the wires may be plated or inlaid with contact metals such as the previous metals generally used as contactors.

For a more complete description of the wiper assembly, its objects and features, the accompanying drawings disclose as follows:

Fig. 1 shows a top view of one set of wipers in a wiper holder.

Fig. 2 shows a profile view of the wiper holder with wires therein.

Fig. 3 is a side view of a single wiper set and the accompanying holder.

Fig. 4 is a side sectional view of an entire wiper assembly.

Fig. 5 is a top view of the dividing insulator.

Shown in Fig. 1 are the three parallel wire spring wipers 10, 20 and 30. As may be seen, each spring is formed into a generally parabolic shaped curve. Although the shape of the wire is not exactly parabolic, the use of terminology associated with parabolas may simplify the explanation and will be used herein.

Thus, wire spring 10 would have the shortest latus rectum of the three springs with succeedingly larger lati rectum of springs 20 and 30. The springs are aligned in parallel and secured within the corresponding grooves (shown in Fig. 2) of holder 48. The holder 48 has a centrally located hole for mounting to the switch shaft and has an extension 41 for use as a connection terminal.

As seen in Fig. 3, the wire springs 10, 20 and 30 each have formed toward their curved end a U-shaped depression such as 32. The remaining depressed sections 22, 12, 13, 23, and 33 are aligned behind curve 32 of Fig. 3 and for the most part do not appear in this figure. Each of the wires is further formed to have its curved tip such as 11, 21, and 31 aligned in a plane to simultaneously contact a plane surface such as a bank contact. As may be noted from Figs. 3 and 4, each wire springs 10, 20 and 30 has a different form angle to place its curved tip (11, 21 and 31) in coplanar but not colinear alignment.

The wiper assembly shown in Fig. 4 is assembled on the shaft 40 which may be the shaft of a two motion step-by-step switch. The shaft 40, in the embodiment shown, has its free end 46 threaded to lock the assembly together. The assembly consists of wiper hub or lock nut 42 fastened to the shaft by means of set screw 7. The hub 42 has a knurled surface 49 to firmly hold the mating surface of the insulating washer 51. In the assembly next appears lower wire spring holder 48' which is identical to holder 48 shown in Fig. 1. Extending from the holder 48' are wire springs 10', 20' and 30' which are also identical to those shown in Figs. 1 and 2. A formed insulator 50 as shown in Fig. 5 extends between the upper and lower sets of wipers and serves to insulate the sets from one another and also maintain the wiper tip spacing and spring tension. This insulator may be omitted if insulation between the wiper sets is not required. The upper set of wipers 10, 20 and 30 is also mounted to the shaft 40 and both sets of wipers are insulated from the shaft by means of the circular L-shaped bushing 43. Completing the assembly are steel washer 44 and nut 45. Nut 45 is tightened to the threaded section 46 of shaft 40 to tighten the assembly.

Further, it should be noted that by using another holder or hub such as 42 having a set screw 47, the threaded end 46 of the shaft and nut 45 can be dispensed with. In this manner both the top and bottom of the wiper assembly would be held in place on the shaft by means of a separate hub 42 complete with set screw 47. Using this embodiment, more than one pair of sets can be affixed to a shaft to provide a switch such as is generally used in telephony.

From the description it can be seen that when shaft 40 is rotated, a wiper set such as 10, 20, 30 is rotated across an arcuate contact bank level and comes to rest on a selected contact, there is a triple multiple connection from the contact through the wipers to the terminal 41. In addition due to the wire spring construction of the wipers, considerable contact pressure can be attained.

Also, as mentioned, the wire material proposed for use is stainless steel although any suitable spring material could adequately be used. It is necessary that any spring material used be capable of being tensioned and retain that tension. The wiper tips 11, 21 and 31 could, as mentioned, have a precious metal inlay where necessary to lengthen the wiper life or as required by specific applications.

What is claimed is:

1. In an automatic switching apparatus having a stationary bank comprising a plurality of contacts aligned in an arcuate pattern, means for sweeping across said bank comprising a plurality of substantially parabolically formed wires of succeedingly lesser curvature concentrically mounted in a single plane, a plurality of conducting tips mounted one on each of said wires and means for rotating said conducting tips simultaneously in a plane parallel to said single plane across the contacts in said bank.

2. A wiper assembly for a stepping switch having a plurality of contacts held in an arcuate pattern in a plane, said wiper assembly comprising a plurality of concentrically mounted hairpin-shaped wires of varying sizes, means for holding said wipers in coplanar fashion at the free ends of said hairpin shape, said holding means rotatable to cause the curved ends of said wires to traverse the contacts in the contact plane, said wires forming a multiple path for current from each of said contacts to the wiper assembly.

3. A wiper assembly for a stepping switch having a contact bank, said bank having a plurality of arcuate bands of contacts, said plurality of bands comprising a top band and an under band, a first set of wipers comprising a plurality of wires of varying formed dimensions, a second set of wipers comprising a plurality of wires of varying formed dimensions, a first conducting plate for holding said first set of wires in a first plane, second conducting plate for holding said second set of wires in a second plane parallel to said first plane, and means for rotating said first and second conducting plates in step by step manner to move said first set of wipers across said top band of contacts and simultaneously move said second set across said under band of contacts, all the wires in a set of wipers simultaneously contacting one of said contacts in a band.

4. In a switch having a plurality of contacts arrayed in arcuate bank levels and having means for rotating wiper assemblies simultaneously across said contacts; a wiper assembly comprising a plurality of rigid wires formed into substantially parabolic shape, said wires of successively smaller formed curvature, means for concentrically holding said wires in a single plane, the curved ends of said wipers extending in cantilever fashion from said holding means, each of said wires having a curved depression outward of said holding means, a cantilever insulator extending from said holding means for resting thereon said depressions, each of said wires having an angled tip at the cantilever end for maintaining said tips in a plane parallel to that of the holding plane.

5. In a stepping switch having an upper and a lower level of stationary contacts and having means for rotating a wiper assembly step-by-step to successively contact sequential stationary contacts, a wiper assembly comprising an upper and a lower wiper set, each of said wiper sets comprising a plurality of substantially parabolically formed wires of succeedingly lesser formed curvature, terminal means for maintaining the wires in each wiper set in a concentric coplanar cantilever manner, an insulator extending from said assembly to separate the upper wiper set from the lower wiper set, formed depressions in said upper and lower wiper set wires for engaging said insulator, the wipers of the upper wiper set each having an angled form at the curved end for maintaining individual contact pressure on each stationary contact of the upper contact level, the wipers of said lower set each having an angled form at the curved end of the parabola for maintaining individual contact pressure on each contact of the lower level of stationary contacts.

References Cited in the file of this patent

UNITED STATES PATENTS

| | | |
|---|---|---|
| 1,257,394 | Reynolds | Feb. 26, 1918 |
| 2,264,045 | Maier | Nov. 25, 1941 |
| 2,443,230 | Coursey | June 15, 1948 |
| 2,497,331 | Swedien | Feb. 14, 1950 |
| 2,734,974 | Graybill | Feb. 14, 1956 |

FOREIGN PATENTS

| | | |
|---|---|---|
| 726,447 | Great Britain | Mar. 16, 1955 |